(12) United States Patent
Matsumoto et al.

(10) Patent No.: US 6,961,504 B2
(45) Date of Patent: Nov. 1, 2005

(54) OPTICAL FIBER ARRAY (75) Inventors: Akira Matsumoto, Nagoya-shi (JP); Masashi Fukuyama, Inuyama (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 09/819,330

(22) Filed: Mar. 28, 2001

(65) Prior Publication Data

US 2002/0009268 A1 Jan. 24, 2002

(30) Foreign Application Priority Data

Mar. 30, 2000 (JP) .................................. 2000-093230
Feb. 19, 2001 (JP) .................................. 2001-042293

(51) Int. Cl.[7] ............................................. G02B 6/00
(52) U.S. Cl. ..................................................... 385/137
(58) Field of Search ............................ 385/137, 59, 65, 385/63

(56) References Cited

U.S. PATENT DOCUMENTS

| | | | |
|---|---|---|---|
| 4,875,969 A | 10/1989 | Hsu et al. ..................... 216/7 |
| 5,764,833 A | 6/1998 | Kakii et al. .................... 385/54 |
| 6,045,269 A | * 4/2000 | Watanabe et al. ............. 385/59 |
| 6,134,371 A | 10/2000 | Yoshida et al. ............. 385/137 |
| 6,195,495 B1 | * 2/2001 | Ota et al. ................... 385/137 |
| 6,215,944 B1 | * 4/2001 | Ota et al. ................... 385/137 |
| 6,215,945 B1 | * 4/2001 | Fukuyama et al. ......... 385/137 |
| 6,324,332 B1 | * 11/2001 | Yamashita et al. .......... 385/137 |

FOREIGN PATENT DOCUMENTS

| | | |
|---|---|---|
| EP | 0 573 288 A2 | 12/1993 |
| EP | 0 943 942 A2 | 9/1999 |
| JP | 64-050004 | 2/1989 |
| JP | 03-155504 | 7/1991 |
| JP | 05-264841 | 10/1993 |
| JP | 06-281834 | 10/1994 |
| JP | 07-020340 | 1/1995 |
| JP | 09-090151 | 4/1997 |
| JP | 10-096836 | 4/1998 |
| JP | 11-142673 | 5/1999 |
| JP | 11-153723 | 6/1999 |
| JP | 11-271563 | 10/1999 |
| JP | H11-337761 A | 12/1999 |
| JP | 11-337761 | 12/1999 |
| JP | 2000-009958 | 1/2000 |
| JP | 2000-338354 A | 12/2000 |
| WO | WO98/05989 | * 2/1998 ............ G02B/6/40 |

OTHER PUBLICATIONS

Patent Abstracts of Japan vol. 008, No. 018 (p–250), Jan. 26, 1984 & JP 58–178310 A (Kogyo Gijutsuin; Others: OJ), Oct. 19, 1983.

(Continued)

Primary Examiner—Javaid H. Nasri
(74) Attorney, Agent, or Firm—Burr & Brown (57) ABSTRACT

An optical fiber array is provided in which an optical fiber tip end is housed in a holding member (2). The holding member (2) consists of a substrate (3) and a cover plate (5). The substrate (3) forms a sectional V shaped housing groove (4) for housing the optical fiber (1) on a top face. The cover plate (5) covers the top face of the substrate (3). An adhesive is filled between the substrate (3) and the cover plate (5) which fixes optical fiber (1) in the housing groove. A distance Y between the substrate (3) and the cover plate (5) is $L/6 \leq Y \leq L$, with Y being the thickness of the adhesive layer and L being a distance from a contact point (P) between the housed optical fiber (1) and the housing groove (4) to the cover plate (5). In this manner, even under severe environmental conditions, a release or delamination of the holding member (2) is not likely to occur, and good optical coupling characteristics can be maintained.

18 Claims, 6 Drawing Sheets

(2 of 6 Drawing Sheet(s) Filed in Color)

OTHER PUBLICATIONS

Patent Abstracts of Japan vol. 015, No. 391 (p–1259), Oct. 3, 1991 & JP 03–155503 A (Nippon Sheet Glass Cp. Ltd.) Jul. 3, 1991.

Kajiyama Shinichi, et al., "High–Density Optical Fiber Array", C–141, Essay from 1994 Autumn Convention Records, Institute of Electronics Information and Communication Engineers, English Translation.

Kajiyama Shinichi, et al., "Soldered Optical Fiber–Array with Metal Sleeves", C–223, Essay from 1994 Autumn Convention Records, Institute of Electronics Information and Communication Engineers, English Translation.

Optical Communication Ultraviolet Cure Type Fluorinated Adhesive Agent : OPTODYNE UV, *Polyfile*, Taiseisha Co., Ltd., 1990, vol. 27, No. 11, p. 40, col. 2, lines 3–6.

\* cited by examiner

OPTICAL FIBER ARRAY

BACKGROUND OF THE INVENTION

1. Field of the Invention

The present invention relates to an optical fiber array having a holding member mounted thereto, and having optical fibers arranged and held within predetermined intervals. More particularly, the present invention relates to a technique of preventing release or delamination of the holding member.

2. Description of Related Art

Figure 4:
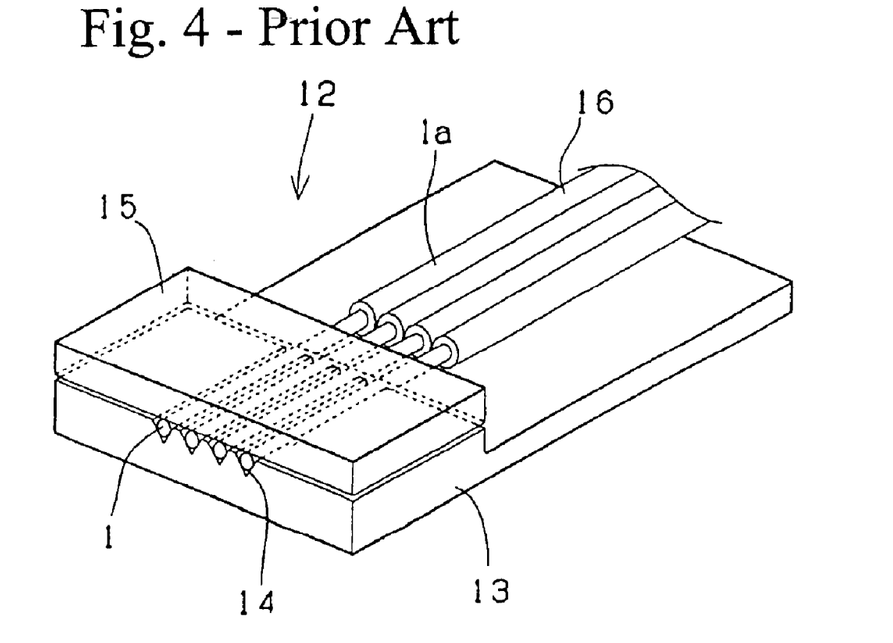
FIG. 4 is a perspective view of a conventional optical fiber array.

Conventionally, a fiber array having optical fibers arranged therein and fixed thereto is formed as shown in FIG. 4. In FIG. 4, reference numeral 12 denotes a holding member that consists of a substrate 13 and a cover plate 15. A plurality of V grooves 14 having a V shaped section (housing grooves) are formed on the substrate. Optical fibers (optical fiber bare portions) 1 are housed in the individual V grooves 14, and an adhesive is filled in the V grooves. Then, the cover plate 15 is positioned on the V grooves to pinch the optical fibers 1 between substrate 13 and cover plate 15. In this manner, the optical fibers 1 are adhered and fixed in the V grooves 14. In addition, reference numeral 1a denotes a covered portion of the optical fibers, where a plurality of the optical fibers 1a are coupled to one another via a covering to form a fiber ribbon 16.

The holding member 12 is formed by processing a glass plate, for example, with the V grooves 14 being formed in parallel on a substrate top which is ground to a mirror face. In addition, a space between adjacent V grooves is small so that an adhesive face is widely formed at the right and left ends of a bundle of the V grooves in order to ensure adhesion between the substrate 13 and the cover plate 15.

However, the above described fiber array is often placed under severe outdoor environments. That is, the fiber array is subject to temperatures ranging from a high temperature of 60° C. to a low temperature of −40° C. Fiber arrays are also subjected to dry, humid and high temperature environments such as desert conditions or the like. The optical fiber array is required to maintain constant and proper performance characteristics under such severe environments for long durations. However, in the case where the above fiber array is subjected to such severe environmental conditions for long durations, there has occurred a phenomenon that the substrate 13 and the cover plate 15 fixing the optical fibers 1 in the V grooves are released or delaminated due to environmental variations over time. This results in the optical fibers being unreliably fixed in the V grooves.

In an optical fiber array, if an optical axis deviates from a predetermined position, an optical transmission loss is increased between this optical fiber and optical part being optically connected therewith. Thus, a very high position precision of 0.5 microns or less is required to maintain the optical connection. If the above release phenomenon occurs, a displacement of the optical fiber occurs, resulting in degraded optical transmission characteristics. In addition, an optical fiber may become detached from the substrate housing the fiber.

SUMMARY OF THE INVENTION

The present invention has been made in order to solve the foregoing problem. It is an object, therefore, of the present invention to provide an optical fiber array in which release or delamination of the holding member components is not likely to occur, even under severe environmental conditions. Thus, proper optical transmission characteristics are maintained because the optical connection, the optical fibers and an optical part is maintained.

In order to solve the foregoing problems, according to a first aspect of the present invention, there is provided an optical fiber array including a holding member that consists of a substrate having housing grooves with cross-sectional V shapes formed thereon, for housing optical fibers on a top face, and a cover plate covering the top face of the substrate. A tip, bare portion of the optical fibers are positioned in the housing grooves and an adhesive is supplied between the substrate and cover plate so as to fix the optical fibers in the housing grooves. A distance M between a center axis of the housing groove located at an outermost radial position among the housing grooves and an end portion of the substrate is 5 times or more than the radium of the optical fiber. A distance Y between the substrate and the cover plate is $L/6 \leq Y \leq L$, with Y being the thickness of the adhesive layer and L being a distance from a contact point P between the housed optical fiber and the housing groove to the cover plate.

According to a second aspect of the present invention, there is provided an optical fiber array wherein a height of a protruding portion of the optical fiber, which protrudes from the upperface of the substrate, is substantially equal to the distance Y between the substrate and the cover plate.

According to a third aspect of the present invention, there is provided an optical fiber array wherein the distance Y between the substrate and the cover plate is $L/4 \leq Y \leq L$.

According to a fourth aspect of the present invention, there is provided an optical fiber array wherein the adhesive is epoxy-based.

According to a fifth aspect of the present invention, there is provided an optical fiber array wherein the width of the cover plate is different from the width of the substrate.

According to a sixth aspect of the present invention, there is provided an optical fiber array wherein a placement face for placing a covered portion of the optical fiber is provided in the rear part of a housing groove forming face. A step is provided between the housing groove forming face and the placement face, thereby placing and housing the optical fiber.

The Inventor has discovered the following results through experimental observations. That is, the above release or delamination is caused by a thin adhesive layer between the substrate and cover plate which spreads outside of the outermost portion of the housing groove. Namely, in the case where a circular optical fiber is housed in a V groove, the adhesive is contracted during curing which is caused by an adhesive stay portion at the periphery of optical fibers (in the housing groove). Also, there is a difference in thermal expansion rates between the adhesive and the substrate or between the adhesive and the cover plate. Alternatively, increased humidity tends to cause expansion of adhesive materials. Accordingly, the stress which is likely to concentrate in portions of the V groove caused by the above phenomena cannot be sufficiently prevented through the used of a thin adhesive layer.

Figure 5:
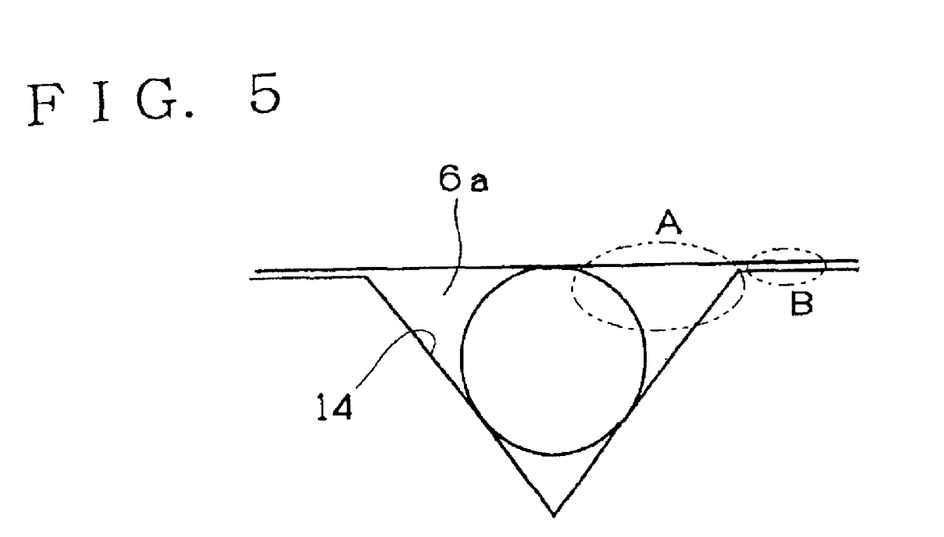
FIG. 5 is an enlarged sectional view illustrating one fiber portion seen in FIG. 4.

A fiber array is fixed between a substrate and cover plate through the use of an adhesive, and also tends to be formed in complicated shapes. Thus, there exists a variety of stresses which are likely to occur in the fiber array, such as partial or isolated strong stresses or a condition of general stress between the substrate and the cover plate. The partial or isolated stress tends to occur at a resin stay portion along the periphery of the fibers fixed in a V groove, as described above. This is believed to be due to a mechanism in which the stress of the adhesive stay portion indicated by A shown in FIG. 5 is applied or transferred to a portion indicated by B. If the adhesive layer of portion B is thin, the stress at this position cannot be absorbed, and a release or delamination between the substrate and cover plate occurs at portion B.

For example, if a release or delamination occurs at a portion of the fiber array, such as portion B, the entire stress is applied or transferred to this portion and water is prone to invade this release portion, which exacerbates the problem and causes further separation or release at portion B.

The present invention is provided in response to the above-discussed problems of prior art adhesive layers. The adhesive layer of the present invention can absorb the stress concentrated at the above-discussed portions of the substrate, and a release of the optical fiber between the substrate is not likely to occur, even under use in severe environments. Thus, proper optical characteristics can be maintained.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

The patent or application file contains at least one drawing executed in color. Copies of this patent or patent application publication with color drawing(s) will be provided by the Office upon request and payment of the necessary fee.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings, which are incorporated in and constitute a part of the specification, illustrate presently preferred embodiments of the present invention and, together with the general description given above and the detailed description of the preferred embodiments given below, serve to explain the principle of the present invention, in which:

FIG. 2(a)–FIG. 2(h) are photographs showing changes in fiber array adhesive portions due to environmental testing conditions, wherein FIGS. 2(a)–(d) are fiber arrays in accordance with the present invention compared to FIGS. 2(e)–(h), which show a conventional fiber array;

FIG. 6(a)–to FIG. 6(c) show adhesive layer ends of optical fiber arrays, wherein FIGS. 7(a) and 7(b) show side views of V groove rear ends of optical fiber arrays, wherein

DETAILED DESCRIPTION OF THE INVENTION

Figure 1:
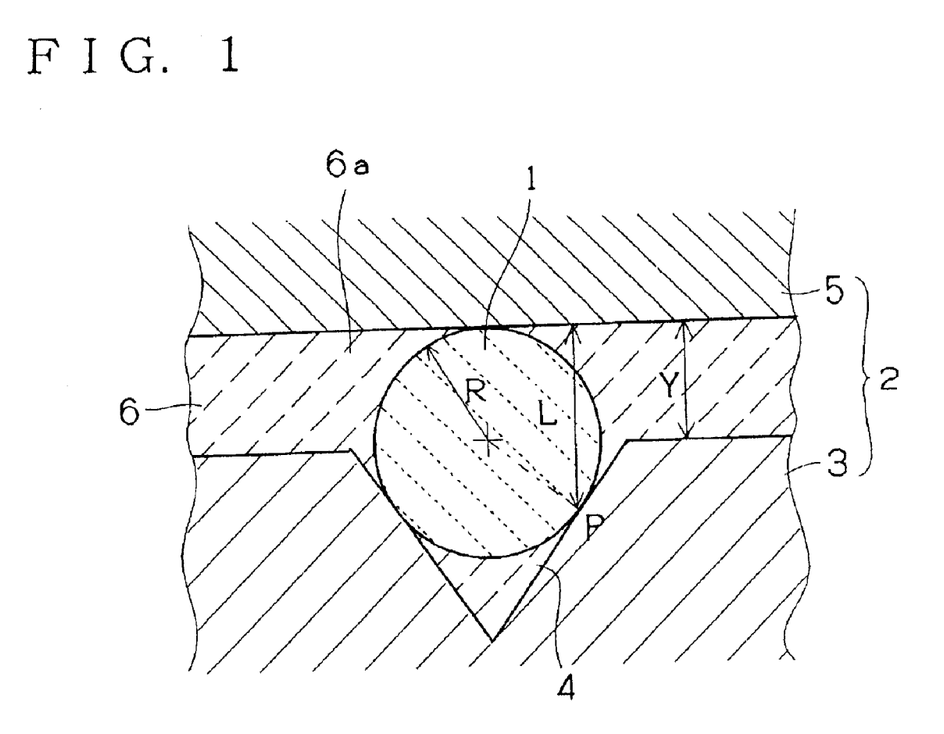
FIG. 1 is an enlarged sectional view of an optical fiber array in accordance with the present invention.

Reference will now be made in detail to the presently preferred embodiments of the invention as illustrated in the accompanying drawings, in which like reference numerals designate like or corresponding parts. FIG. 1 is an enlarged sectional view of an optical fiber array according to the present invention, in which: reference numeral 1 denotes an optical fiber (a bare optical fiber); reference numeral 2 denotes a holding member that consists of a substrate 3 and a cover plate 5; a V groove 4 is formed on the substrate 3; and an optical fiber 1 is housed in the V groove 4. In addition, an adhesive 6a is filled between the substrate 3 and cover plate 5 along the periphery of the optical fiber 1. An opening angle of the V groove 4 is 70 degrees, for example. The optical fiber 1 is formed to be 62.5 microns in radius, for example.

The V groove 4 is formed such that a part of the optical fiber 1, being housed therein, is slightly protruded from the upper face of the substrate 3, and the protrusion length of the optical fiber is substantially equal to the thickness of the adhesive layer 6 formed between the substrate 3 and the cover plate 5. In addition, a distance M between the center of the housing groove at the outer most portion of the substrate 3 and the substrate end (shown in FIG. 3) is 5 times or more of the optical fiber radius relevant to the radium R of the optical fiber 1.

Then, the thickness Y of this adhesive layer 6 is defined as follows, a distance L, which is a contact point P between the V groove 4 and the optical fiber 1 to the cover plate 5 is: $L/6 \leq Y \leq L$.

If the thickness Y of the adhesive layer 6 exists in the above defined range, as shown in the test results described later, the adhesive layer 6 sufficiently absorbs stresses generated from the contraction of the adhesive during curing. In addition, adhesive layer 6 sufficiently absorbs stresses generated by a difference in thermal expansion rate between the substrate 3 and the cover plate 5 such that alignment of the optical fibers can be maintained without being released from the V grooves, even under severe environmental conditions.

In addition, from the viewpoint of adhesives, the stress caused by the adhesive increases particularly with adhesives having a higher Young's Modulus. For example, in the case where an epoxy based adhesive is employed, the Young's Modulus is generally high as compared with an acryl based or silicon based adhesive. Thus, the stress is also increased, and the adhesive layer structure of the present application is effective. In particular, when an epoxy based adhesive having Young's Modulus not less than 2 $kgf/mm^2$ is used, the stress is particularly increased. Thus, the adhesive layer structure of the present application is effective.

The adhesive used in the present invention denotes one which is used for adhering and bonding at least an outer peripheral surface of a bare optical fiber, cover plate and substrate. In addition, in order for the optical fiber 1 to come into reliable two point contact with the inclined face of the V groove 4, it is preferable that a contact point is moved upwardly with a margin of about 10 microns from a theoretical contact point in consideration of processing precision or measurement precision. In this case, the above (range 1) is $(L-10 \text{ microns})/6 \leq Y \leq (L-10 \text{ microns})$.

Table 1 compares changes of the adhesive portion of the fiber array during environmental testing (boiling test). As is shown in Table 1, the fiber arrays were produced to have varying thicknesses Y of the adhesive layer 6. The fiber arrays were soaked in boiling water to investigate whether release or delamination of the holding member occurred after a predetermined time had elapsed. In Table 1, O denotes a good state in which no release of optical fibers occurred, Δ denotes a state in which partial release of the optical fibers occurred, and X denotes a state in which an extensive release of the optical fibers occurred.

TABLE 1

| Thickness of adhesive layer | Boiling time | | | |
|---|---|---|---|---|
| Y | 15 hr | 36 hr | 60 hr | |
| L/2 | O | O | O | Photograph |
| L/4 | O | O | O | |
| L/6 | O | O | Δ | |
| L/8 | X | X | X | Photograph |

FIGS. 2(a)–(h) show photographs illustrating the changes to the optical fiber array adhering portion due to the environmental tests shown in Table 1. FIG. 2(a)–2(d) are photographs of Y=L/2 shown in Table 1. FIG. 2(e)–2(h) are photographs of Y=L/8 in a conventional optical fiber array. In addition, the holding member 2 of the optical fiber array taken as each of the photographs shown in FIG. 2 is schematically shown in FIG. 3.

Figure 3:
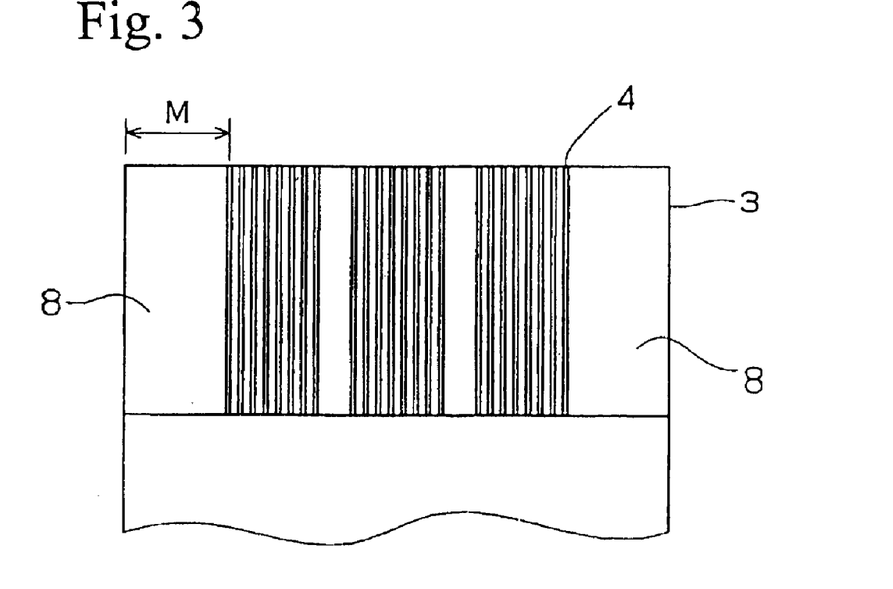
FIG. 3 is an illustrative view of a holding member in accordance with the present invention as seen in FIG. 2.

FIG. 3 is a plan view of the holding member. As shown in the figure, the holding member 2 used in the environmental tests illustrated in Table 1 has three groups of housing grooves, each consisting of eight grooves positioned on substrate 3. The optical fibers 1 are positioned on the V grooves of substrate 3, adhesive is applied thereon, and then, the cover plate 5 is positioned on the optical fibers. The part of the optical fiber 1 that protrudes from the substrate (i.e., extending above a plane parallel to top surface of the V grooves) is varied by changing the angles of the V grooves. This also functions to adjust the thickness Y of the adhesive to a desired thickness.

Figure 2:
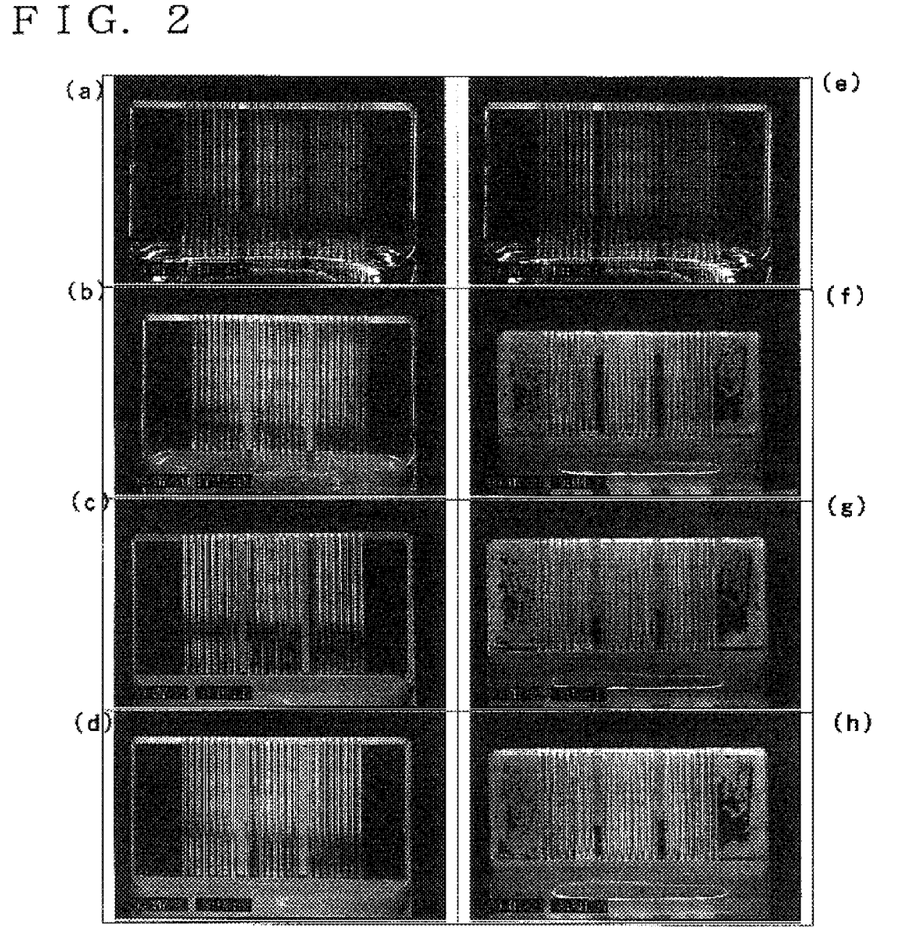

In FIG. 2, although there is no change at the 60-hour boiling point in the photographs 2(a)–(d), there occurs a spot-like pattern on main adhesive faces 8, 8 (shown schematically in FIG. 3) of the substrate after 15 hours or more of boiling in photographs 2(e)–(h). Additionally, a portion in a different state from a state before boiled occurs between the optional fiber groups as well. These sites are where adhesive has been released. From these photographs, in the case where the thickness Y of the adhesive layer is L/8, release has already occurred after 15 hours of boiling. That is, when the thickness Y of the substrate is L/2, no release occurs even after 60 hours of boiling.

Thus, from the test results shown in Table 1, it can be judged that, as long as a distance between the center axis of the housing groove at the outermost portion of the housing grooves and the substrate end is 5 times or more of the optical fiber radius; and the adhesive layer thickness Y is L/6 or more, release of adhesive is unlikely to occur, and the optical fiber array can be used even under severe environments. Further, if the adhesive layer thickness Y is L/4 or more, it can be judged that no release of adhesive occurs, and a good bonding state can be continuously maintained.

In the meantime, the optical fiber array is generally formed so that the fibers are pressed in the substrate V groove 4 by the cover plate 5. Although optical grinding is applied to the tip end face of the optical fiber array, the fiber end face is required to be set to a desired angle. Thus, in general, grinding is performed when a side face parallel to the V groove 4 is defined as a reference during grinding. At this time, although the side face of the substrate 3 can be easily processed so as to be parallel to the V groove 4, the cover plate 5 is merely loaded on the optical fibers 1. Thus, it is not easy that the side face of the cover plate 5 is parallel to the optical fibers 1.

Therefore, it is natural that the grinding standard face is on the side face of the substrate 3 so that the cover plate 5 should not be at the outside of the right and left of the substrate 3 in order to ensure this state. As a measure, the width of the cover plate 5 is made smaller than that of the substrate 3, whereby slight displacement can be permitted, thus making it possible to apply the cover.

Figure 6:
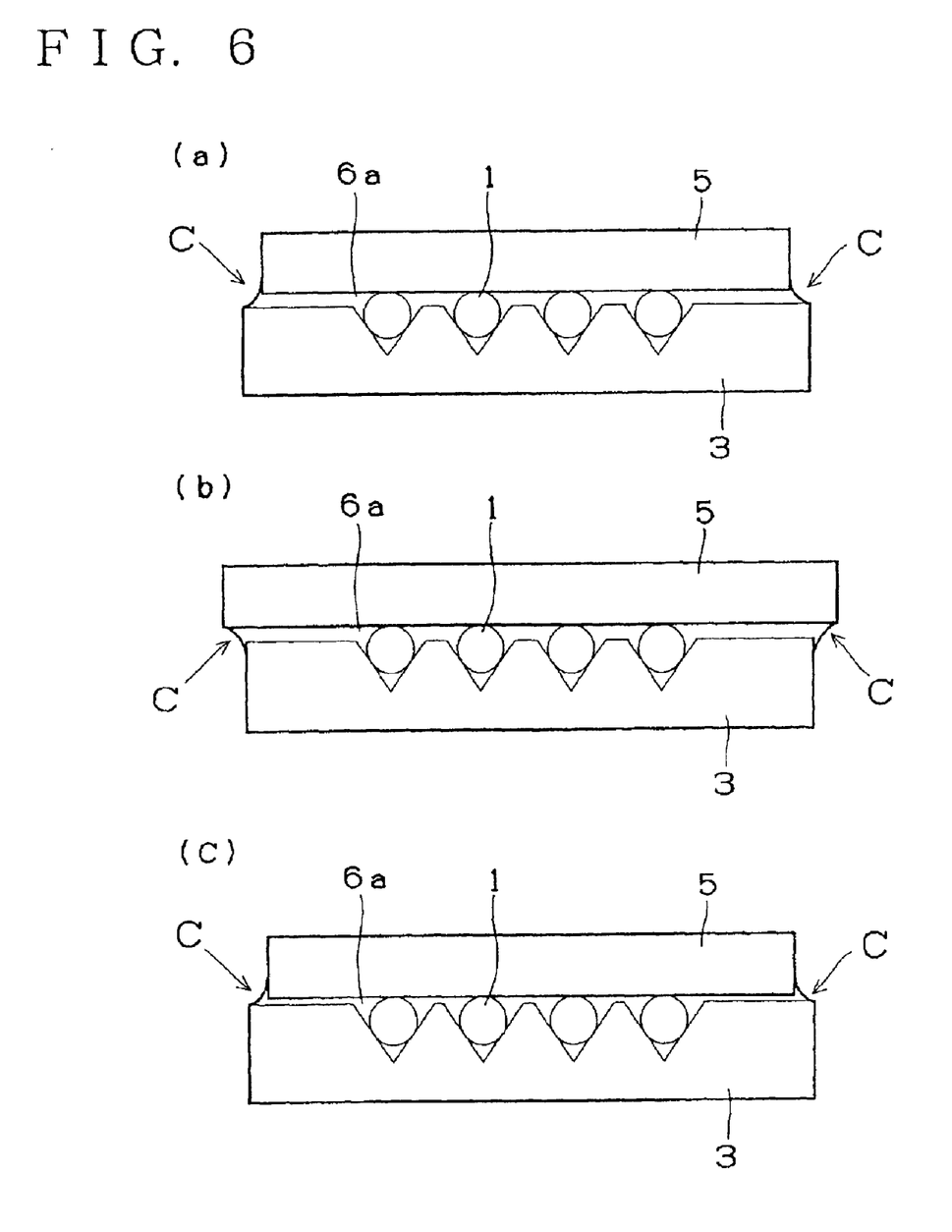
FIG. 6(a) shows a sectional view in accordance with the present invention.
FIG. 6(b) shows a sectional view in accordance with another example of the present invention.
FIG. 6(c) shows a sectional view illustrating a conventional fiber array.

In this case, as shown in FIG. 6, the adhesive 6a is pooled at a stepped portion C in a meniscus manner, which provides an effect of increasing adhesive force. However, in the case where the adhesive layer is thin, stresses occurring at stepped portion C caused an occurrence of the release of the adhesive layer (the mechanism in which a release occurs is similar to that occurring in the V grooves). In particular, this site is situated at the outside of the substrate and is subjected to open air. Thus, if a release of adhesive occurs, it permits moisture to easily invade the interior of the substrate, which, in turn, accelerates the progress of adhesive release.

As can be understood from the above, stepped portion C is an important portion that prevents a release of adhesive. As shown in FIG. 1, as long as a large adhesive layer is ensured, stress does not concentrate, and a release is unlikely to occur. Thus, the present invention makes it possible to ensure high reliability in the same manner as that employed for the V groove portion.

FIG. 6(a) is a sectional view illustrating an optical fiber array according to the present invention, and FIG. 6(c) is a sectional view illustrating a conventional optical fiber array.

As shown in FIG. 6(b), even if the width of the cover plate 5 is greater than that of the substrate 3, a meniscus-like pool portion is formed at the stepped portion C. The construction of the present invention, i.e., a large adhesive layer is ensured, whereby the stress does not concentrate, a release does not occur, and high reliability can be ensured in the same manner as the V groove portion. However, as described above, the end face of the optical fiber array is hardly ground precisely, and thus, the cover plate width is preferably formed to be smaller than the substrate width.

Figure 7:
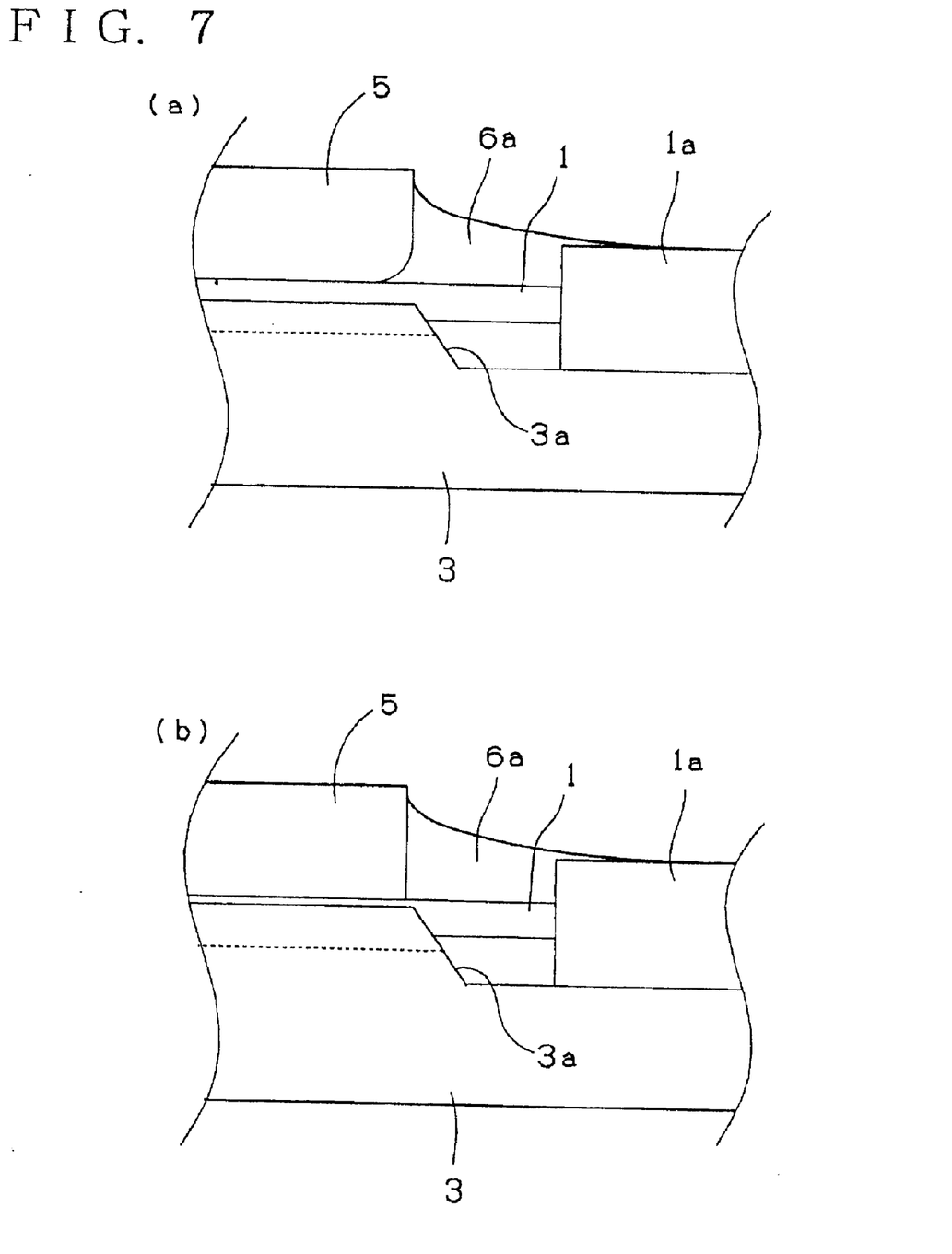
FIG. 7(a) shows a side view of essential parts according to the present invention.
FIG. 7(b) shows a side view of essential parts of a conventional fiber array.

FIGS. 7(a)–7(b) show side views of V groove rear ends in accordance with the present invention and a conventional fiber array, in which: reference numeral 1 denotes an optical fiber; reference numeral 3 denotes a substrate; reference numeral 3a denotes a step; reference numeral 5 denotes a cover plate; and reference numeral 6a denotes an adhesive layer.

With respect to stepped portion 3a, optical fibers are easily damaged by an edge of the step. In the case where a release occurs, even partially, at stepped portion 3a, there is an apprehension that the damage of the fiber due to the step is further accelerated by the function of stress. Thus, it is very important that no release of adhesive occurs at stepped portion 3a.

As shown in FIG. 7(a), in the case where a step 3a is provided at the rear end of a V groove, which functions to reduce the concentration of the stress applied to the tip end of the optical fiber, and a cover portion mount face is provided at the rear part of the substrate by one stage lower than a V groove forming face, a large amount of adhesive 6a exists in step 3a. Thus, the stress at this portion, which is caused by the adhesive, is concentrated in the adhesive layer 6 between the substrate 3 and the cover plate 5. In the case of such structure, the present invention is particularly effective.

Further, as shown in FIG. 7(a), a taper is preferably provided at the end at the substrate side of the cover plate 5 in order to reduce the stress more significantly. Namely, the thickness of the adhesive layer is made gradually closer to the adhesive thickness Y, whereby the stress concentration can be further prevented.

In addition, in the above embodiments, when the optical fibers are fixed by being pinched between the substrates 3 and the cover plate 5, the cover plate is abutted against the optical fibers such that the thickness of the adhesive layer is equal to the height of the portion of the optical fibers which protrude from the V grooves on the substrate. However, as long as the optical fibers securely come into contact with a V groove at two points, it may not be necessary to abut the cover plate with a portion of the optical fibers. Further, although a plurality of V grooves are generally provided on the substrate, even if one V groove exists, an adhesive layer can be formed as described above, and good optical coupling characteristics can be maintained.

(Advantageous Effect of the Invention)

As has been described above in detail, according to the first to fourth aspects of the invention, even under severe environments, a release hardly occurs between the optical fiber and the substrate or fixed substrate, and good optical characteristics can be maintained.

According to the fifth aspect of the invention, in addition to the advantageous effects of any one of the first to fourth aspects, the width of the cover plate is different from the width of the substrate. Thus, a meniscus-like adhesive pool portion is formed which increases adhesive forces.

According to the sixth aspect of the invention, in addition to the advantageous effects of any one of the first to fifth aspects, the stress applied to the tip end of the optical fiber is reduced, and a release hardly occurs.

Additional advantages and modifications will readily occur to those skilled in the art. Therefore, the invention in its broader aspect is not limited to the specific details and representative embodiments shown and described herein. Accordingly, various modifications may be made without departing from the spirit or scope of the general inventive concept as defined by the appended claims and their equivalents.

What is claimed is:

1. An optical fiber array, comprising: a holding member including a substrate having flat surfaces arranged on opposite sides of a group of sectional V-shaped housing grooves formed in said substrate for housing optical fibers on a top face, said optical fibers each having an optical fiber tip end bare portion housed in said holding member; a cover plate positioned on the substrate; and an adhesive provided directly between the substrate and the cover plate to fix the optical fibers in the housing grooves, wherein a distance between a center axis of an outermost housing groove and an end portion of the substrate is at least five times larger than the radius of the optical fibers, a distance Y between the flat surfaces of the substrate and the cover plate is $L/6 \leq Y \leq L/2$, with Y being a thickness of the adhesive between the flat surfaces and L being a distance from a contact point between the housed optical fibers and the housing grooves to the cover plate, and wherein said adhesive forms a meniscus between (i) opposed sides of the cover plate and the flat surfaces of the substrate, or (ii) opposed end portions of the substrate and respective surface portions of the cover plate, and the height of the meniscus is greater than Y.

2. An optical fiber array as claimed in claim 1, wherein a height of a portion of the optical fibers which protrudes from the housing grooves on the substrate is substantially equal to the distance Y between the substrate and the cover plate.

3. An optical fiber array as claimed in claim 1, wherein the distance Y between the substrate and the cover plate is $L/4 \leq Y \leq L/2$.

4. An optical fiber array as claimed in claim 1, wherein the adhesive is epoxy-based.

5. An optical fiber array as claimed in claim 1, wherein a width of the cover plate is different from a width of the substrate.

6. An optical fiber array as claimed in claim 1, further comprising a placement face for placing a covered portion of the optical fibers provided at a rear part of a housing groove forming face, and a step provided between the housing groove forming face and the placement face for placing and housing the optical fibers.

7. An optical fiber array as claimed in claim 2, wherein the distance Y between the substrate and the cover plate is $L/4 \leq Y \leq L/2$.

8. An optical fiber army as claimed in claim 2, wherein the adhesive is epoxy-based.

9. An optical fiber array as claimed in claim 3, wherein the adhesive is epoxy-based.

10. An optical fiber array as claimed in claim 2, wherein a width of the cover plate is different from a width of the substrate.

11. An optical fiber array as claimed in claim 3, wherein a width of the cover plate is different from a width of the substrate.

12. An optical fiber array as claimed in claim 4, wherein a width of the cover plate is different from a width of the substrate.

13. An optical fiber array as claimed in claim 2, further comprising a placement face for placing a covered portion of the optical fibers provided at a rear part of a housing groove forming face, and a step provided between the housing groove forming face and the placement face for placing and housing the optical fibers.

14. An optical fiber array as claimed in claim 3, further comprising a placement face for placing a covered portion of the optical fibers provided at a rear part of a housing groove forming face, and a step provided between the housing groove forming face and the placement face for placing and housing the optical fibers.

15. An optical fiber array as claimed in claim 4, further comprising a placement face for placing a covered portion of the optical fibers provided at a rear part of a housing groove forming face, and a step provided between the housing groove forming face and the placement face for placing and housing the optical fibers.

16. An optical fiber array as claimed in claim 5, further comprising a placement face for placing a covered portion of the optical fibers provided at a rear part of a housing groove forming face, and a step provided between the housing groove forming face and the placement face for placing and housing the optical fibers.

17. An optical fiber array, comprising: a holding member including a substrate having flat surfaces arranged on opposite sides of a group of sectional V-shaped housing grooves formed in said substrate for housing optical fibers on a top face, said optical fibers each having an optical fiber tip end bare portion housed in said holding member; a cover plate positioned on the substrate; and an adhesive provided directly between the substrate and the cover plate to fix the optical fibers in the housing grooves, wherein a distance between a center axis of an outermost housing groove and an end portion of the substrate is at least five times larger than the radius of the optical fibers, and, over the entire length of the cover plate, a distance Y between the flat surfaces of the substrate and the cover plate is $L/6 \leq Y \leq L/2$, wherein Y is a thickness of the adhesive between the flat surfaces and L is a distance from a contact point between the housed optical fibers and the housing grooves to the cover plate.

18. An optical fiber array as claimed in claim 1, further comprising a plurality of groups of said sectional V-shaped housing grooves formed in said substrate, each adjacent pair of groups being separated by flat surfaces.

* * * * *